Dec. 10, 1957 D. E. BLACKMER 2,816,209
PERCUSSIVE WELDER CONTROL DEVICES
Filed Oct. 27, 1955 2 Sheets-Sheet 1
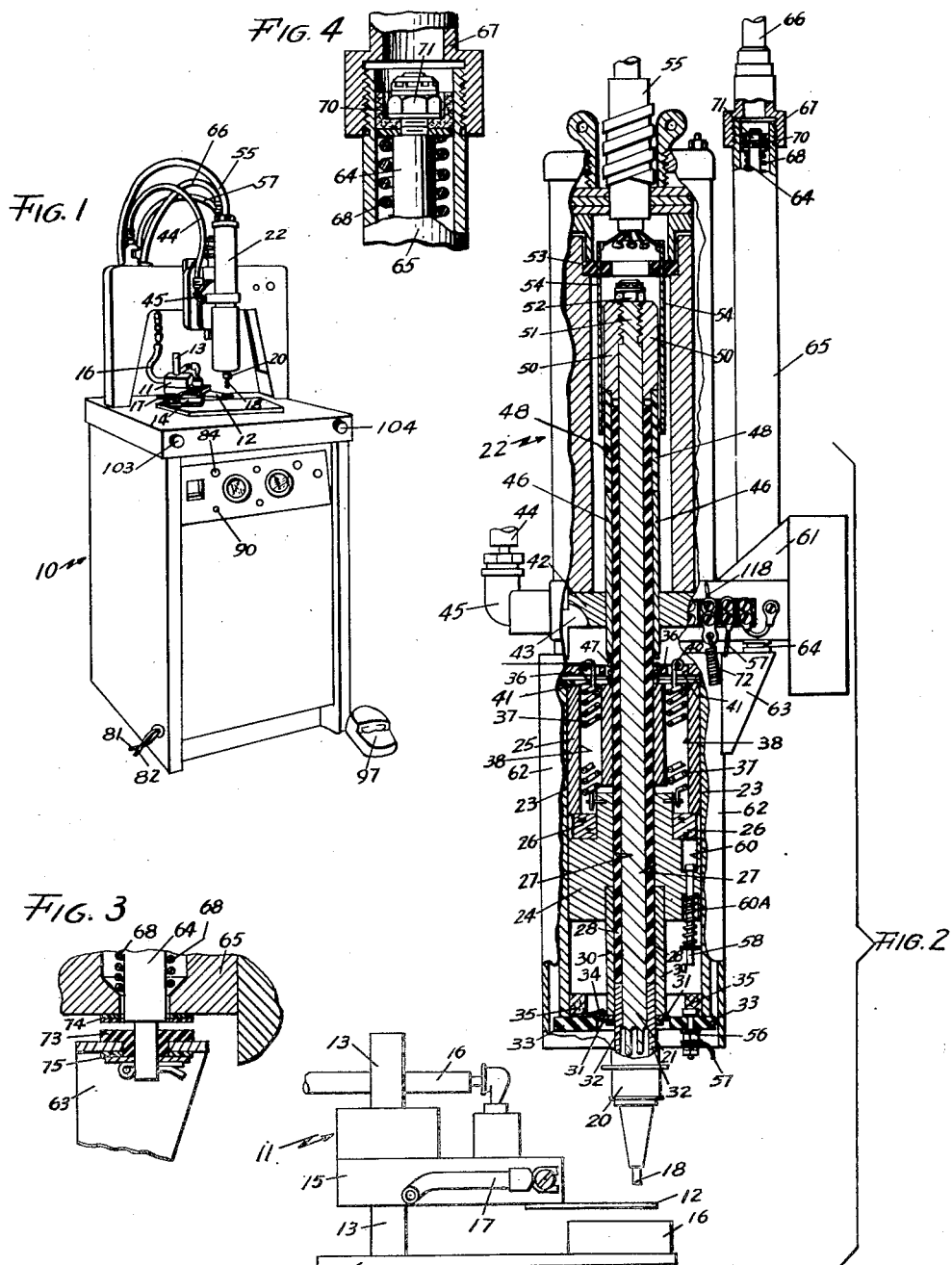
INVENTOR
DAVID E. BLACKMER
ATTORNEY Dec. 10, 1957     D. E. BLACKMER     2,816,209
PERCUSSIVE WELDER CONTROL DEVICES
Filed Oct. 27, 1955     2 Sheets-Sheet 2
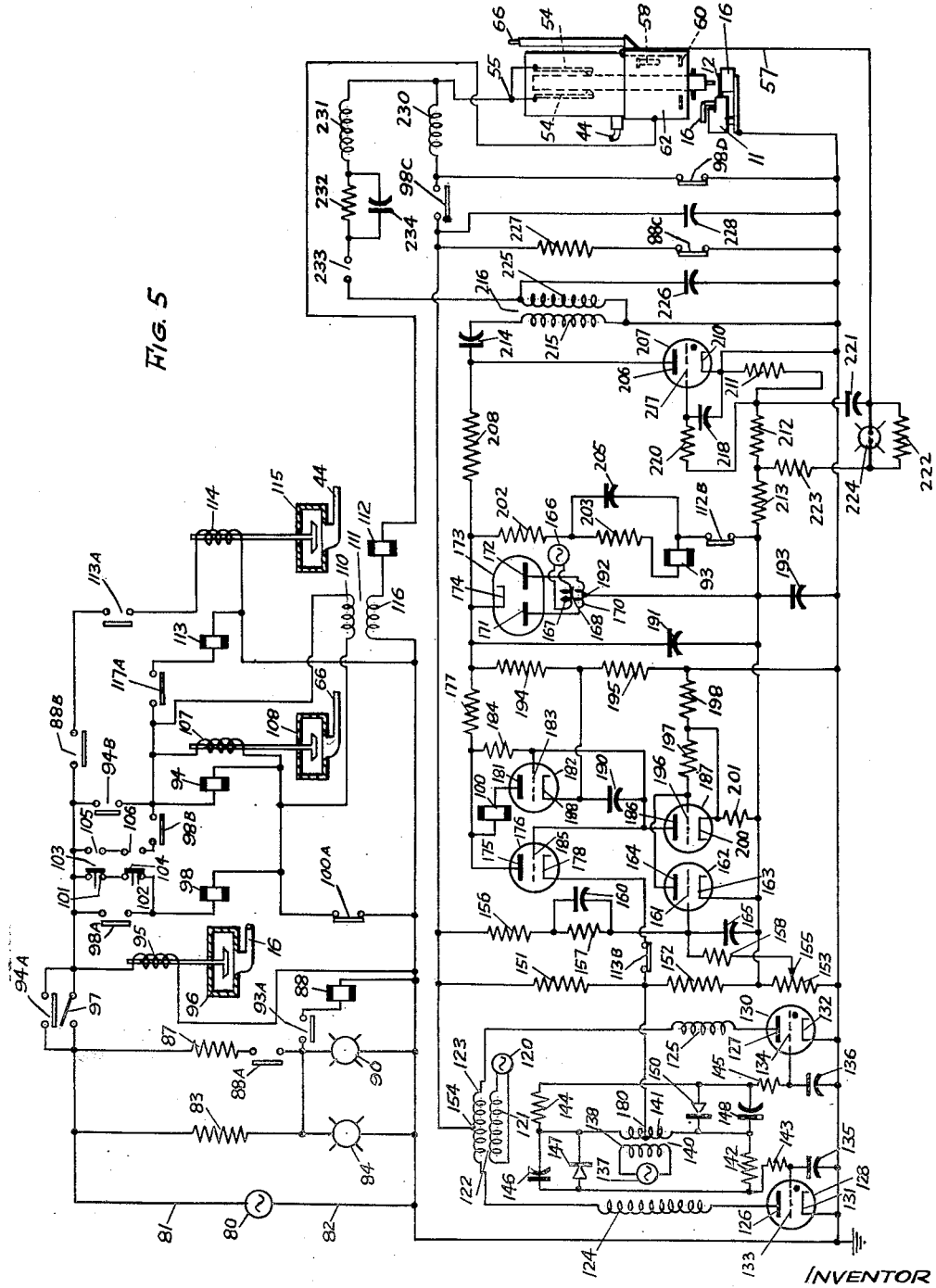
INVENTOR
DAVID E. BLACKMER
BY
Elmer J. Gorn
ATTORNEY

United States Patent Office 2,816,209
Patented Dec. 10, 1957

2,816,209

PERCUSSIVE WELDER CONTROL DEVICES

David E. Blackmer, Reading, Mass., assignor to Raytheon Manufacturing Company, Waltham, Mass., a corporation of Delaware Application October 27, 1955, Serial No. 543,112

7 Claims. (Cl. 219—95)

This invention relates to percussive welding apparatus, and more particularly to the voltage control and safety devices used with such apparatus.

In percussive welding, voltages of the order of 200 to 2,000 volts are used between the upper workholder and the lower workholder and between one or the other of these workholders and the frame. Thus, it is necessary to protect personnel from contact with the workholders at any time when such a voltage difference exists and to prevent such a voltage difference from existing at a time when the operator must contact the workholders, as when work is inserted and removed. In order to prevent damage to the equipment, it is desirable to give an indication when the large capacity used to hold energy for discharge during the welding cycle is fully charged, preferably by operating a relay, and to prevent application of welding current when the energy storage capacitor is not fully charged. It is also desirable to change voltage smoothly over the useful range without exceeding the limits and to prevent overcharge of the capacitor mentioned above.

By the present invention, a shield is provided about the upper workholder that moves down to surround the weld area to prevent contact with the electrodes by the operator and to contain sparks ejected from the weld area. The shield is made part of a circuit that prevents the weld cycle from progressing until the shield is fully extended and touching either the work or the base to which the lower workpiece is attached by the lower workpiece holder. A sliding contactor is provided that applies welding current to the upper workholder. This sliding contact is so arranged as to prevent voltage appearing on the head until the above-mentioned switch is closed. A grounding switch is provided to ground the head when the shield and head are in position for replacing the upper workpiece. Two push buttons are provided which must both be pushed to start the weld cycle, and both must be released after a weld cycle before the next cycle can start. Thus the operator cannot fasten down one of the push buttons and have one hand available to place near the weld area during the weld cycle. A timer is provided to shut down the charge circuit and rapidly discharge the capacitor if a weld should not be completed within a predetermined time, such as .6 of a second after the weld cycle starts, to protect against component failure or the operation of the weld cycle when there is no work in either holder. These various circuits and devices operate to give a safe and relatively foolproof equipment.

Other and further advantages of this invention will be apparent as the description thereof progresses, reference being had to the accompanying drawings wherein:

Fig. 1 is an isometric view of a percussive welding equipment utilizing the invention;

Fig. 2 is a side view of the workholders partially broken away;

Figs. 3 and 4 are enlarged views, partly broken away, of portions of Fig. 2; and Fig. 5 is a schematic diagram of a representative circuit embodying the invention.

In Fig. 1, the reference numeral 10 designates a cabinet containing the electrical circuitry, the hydraulic pumps, reservoirs, and solenoid-operated valves of the equipment to be described later. The lower workholder, generally designated by the reference numeral 11, has a foot 12, and is supported for vertical linear movement and horizontal rotation by a post 13 supported on a plate 14. Means 15 of any of the well-known types is provided for hydraulically raising and lowering the lower workholder proper, or foot 12, in response to fluid pressure supplied by a hose 16 under control of a solenoid-operated valve to be described later in connection with the description of the electrical circuit. The hydraulic operation of the foot 12 serves to hold down the lower workpiece during the welding operation. The details of the hydraulic system have not been shown or described in detail in the interests of simplification, as they form in themselves no part of the invention and may be of any convenient known design. The lower workholder is connected to the electrical circuit described later by means of a wire 17.

The upper workpiece 18 is supported by an upper workpiece holder 20. The upper workpiece holder is supported by a rod 21 driven by a hydraulic mechanism designated by the reference numeral 22. This hydraulic system comprises a cylinder 23 within which is mounted a heavy piston comprising a lower part 24 and an upper part 25 separated by a resilient ring 26. The upper workpiece holder supporting rod 21 fits within an axial hole 27 in the pistons 24 and 25 and is separated from them by a sleeve of insulating material 28. The lower part 24 of the piston rests on a metallic sleeve 30 concentrically mounted about the insulating sleeve 28. A ring 31 of conductive material is attached to the rod 21 through a conductive sleeve 32 near its lower end. The cylinder 23 is closed at its lower end by an annular plate 33 of insulating material. One or more fingers 34 of conducting material are mounted on the plate 33 in electrical contact with the cylinder 23. A ring 35 of resilient material is mounted on top of the ring 33 to absorb the kinetic energy of the descending pistons 24 and 25. The upper piston 25 is supported from a plate 36 by means of springs 37 set in openings 38 in the piston 25 at their lower ends and to fastenings 40 set across the openings 41 in the plate 36. The cylinder 23 is closed at the top by a plate 42 formed with an opening 43 to receive compressed air from a pipe 44 through a fitting 45. A sleeve 46 of conductive material surrounds the sleeve 28 of insulating material in the region where the rod 21 passes through the plate 42. This sleeve 46 is fastened to the piston 25 through a spring 47. A second insulating sleeve 48 is fitted over the upper end of the sleeve 28. A cylindrical piece 50 of conductive material is fitted over the upper end of the rod 21. This upper end 51 of the rod 21 is threaded to receive a nut 52. A plate 53 of insulating material is positioned across the upper end of the cylinder 22 and serves to insulatingly support a plurality of conductive fingers 54 connected by means of a multiconductor cable 55 to a source of welding energy, to be described later. The upper contact 58 of a pair is resiliently mounted in an opening 60 in the lower piston 24 by means of a spring 60A and is electrically connected to the main frame of the machine through pistons 24 and 25, the cylinder 23, and a mounting bracket 61. A cylindrical shield 62 of conductive material is mounted concentrically and insulatedly about the cylinder 23 by means of a bracket 63 and rod 64 driven by a pneumatic cylinder 65 supplied by air from a solenoid-operated valve to be described later over a pipe 66 and a fitting 67. The rod 64 is supported in the cylinder 65 by a spring 68 as has been best seen in Figs. 3 and 4. A cup 70 of leather or other convenient material is attached to the upper end of the rod 64 by means of a nut 71 to provide a shield so that the air from the pipes 66 can drive the rod 64 downward. The shield 62 is partly retracted by means of a spring 72 that also serves to connect electrically to the circuitry to be described. The rod 64 and cylinder 65 are prevented from making electrical contact with the bracket 63 by means of a bushing 73 of insulating material and insulating washers 74 and 75, shown in Fig. 3.

In the electrical circuit shown in Fig. 5, electrical power for the equipment is obtained from a source 80 over wires 81 and 82. A resistor 83 and a pilot light 84 are connected across the source 80. A resistor 87, a set of normally open contacts 88A, controlled by a relay 88, and a second pilot light 90 are also connected in series across the source 80. The junction of resistor 83 and light 84 is connected to the junction of contacts 88A and lamp 90. A normally open set of contacts 93A, operated by relay 93, and the coil of the relay 88 are connected in series across the pilot light 90. The normally open contacts 94A of a relay 94 and the coil 95 of a solenoid-operated valve 96 that supplies compressed air to the foot 11 through the pipe 16 are also connected in series across the source 80. The contacts 94A are shunted by a normally open foot-operated switch 97. The coil 95 is shunted by a normally open set of contacts 98A operated by the coil of the relay 98, the coil of relay 98 and a set of normally closed contacts 100A operated by the relay 100. The set of contacts 98A are shunted by two sets of normally closed contacts 101 and 102 operated by pushbuttons 103 and 104, respectively, connected in series. The contacts 98A and the relay 98 are shunted by a normally open set of contacts 94B and the coil of the relay 94 connected in series. The contacts 94B are shunted by two sets of normally open contacts 105 and 106 operated by the push buttons 103 and 104, respectively, and a set of normally open contacts 98B connected in series. A coil 107 that operates a valve 108 that supplies compressed air to the shield driving cylinder 65 through pipe 66 is shunted across the coil of the relay 94. The primary 110 of the transformer 111 is also shunted across this coil. The junction of the contacts 94B and 98B is connected to the contacts 100A through a set of normally open contacts 112A operated by the relay 112 and the coil of the relay 113 connected in series. The junction of the contacts 105 and 94A is connected to the contacts 100A through the normally open contacts 88B operated by the relay 88 and a set of normally open contacts 113A and the solenoid 114 that operates the valve 115 that supplies compressed air to the upper workpiece holder cylinder 23 through pipe 44. The secondary 116 of the transformer 111 is connected through the coil of the relay 112 to the shield 62 through the spring 71 and terminal 118 (shown in Fig. 2). An A. C. voltage from a source 120 is applied across the primary 121 of a transformer 122, the secondary 123 of which is connected between two inductances 124 and 125, the other ends of which are connected to the plates 126 and 127 of two thyratrons 128 and 130, the cathode 131 and 132 of which are connected together and to one side of the source 80. The grids 133 and 134 of the thyratrons 128 and 130 are coupled to their respective cathodes through capacitors 135 and 136. A source of A. C. voltage 137 is connected across the primary 138 of a transformer 140. One end of the secondary 141 of this transformer is connected to the grid 133 through resistors 142 and 143, and the other end of the secondary is connected to the grid 134 through resistors 144 and 145. The junction of resistors 142 and 143 is coupled to the junction of the secondary 141 and the resistor 144 through a capacitor 146 shunted by a rectifier 147 connected in the indicated polarity. The junction of resistors 144 and 145 is coupled to the junction of the secondary 141 and the resistor 145 through a capacitor 148 shunted by a rectifier 150 connected in the polarity indicated. Resistors 151, 152, and a potentiometer 153 are connected in series between a center tap 154 on the secondary 123 of the transformer 122 and the cathodes 131 and 132. The center tap 154 is also connected to the arm 155 through resistors 156, 157, and 158. A capacitor 160 is shunted across resistor 157. The junction of resistors 157 and 158 is connected to the grid 161 of a tube 162 having a cathode 163 and a plate 164. The grid 161 is coupled to the cathode 163 through a capacitor 165. A source of A. C. voltage 166 is connected across the primary 167 of a transformer 168. Each end of the secondary 170 is connected to a plate 171 or 172 of a rectifier 173. The cathode 174 is connected to the plate 175 of a tube 176 through a resistor 177. The cathode 178 of tube 176 is connected to a center tap 180 on the secondary 141 of the transformer 140 through a set of normally closed contacts 113B operated by the relay 113. The cathode 174 of the rectifier 173 is also connected to the plate 181 of a tube 182 through the resistor 177 and the coil of the relay 100. The grid 183 of the tube 182 is connected to the cathode 174 through resistors 184 and 177. The grid 183 is also connected directly to the grid 185 of the tube 176 and to the plate 186 of a triode 187 and is coupled to the cathode 188 of the triode 182 through a capacitor 190. A capacitor is connected between the cathode 174 of the tube 173 and a center tap 192 on the secondary 170 of the transformer 168. A capacitor 193 is connected between the center tap 192 and the cathode 132 of the thyratron 130. Resistors 194 and 195 are connected in series between cathode 174 of tube 173 and the cathode 132 of tube 130. The junction of resistors 194 and 195 is connected to the cathode 188 of the triode 182. The plate 164 of the tube 162 is connected to the grid 196 of the tube 187 and to the cathode 174 of the tube 173 through resistors 197, 198, 195 and 194. The junction of resistors 197 and 198 is connected to the cathode 200 of the triode 187. The cathode 200 of the triode 187 is also connected to the center tap 192 on secondary 170 through a resistor 201. Resistors 202 and 203, the coil of a relay 93, and a normally closed set of contacts 112B operated by the relay 112 are connected in series between the cathode 174 and the center tap 192. A capacitor 205 is shunted across the resistor 203 and the coil of the relay 93. The plate 206 of a thyratron 207 is connected through a resistor 208 to the cathode 174 of the rectifier 173. The cathode 210 is connected to the center tap 192 through resistors 211, 212, and 213 connected in series. The plate 206 is coupled to the cathode 210 through a capacitor 214 and the primary 215 of a spark coil 216. The grid 217 is coupled directly to the cathode 210 through a capacitor 218. The junction of resistors 211 and 212 is connected to the grid 217 through a resistor 220. Resistor 212 is shunted by capacitor 221 and resistors 222 and 223 connected in series. Resistor 223 is shunted by a neon bulb 224. The secondary 225 of the transformer 216 is shunted by a capacitor 226. The center tap 154 of the secondary 123 of the transformer 122 is connected to the cathode 131 of the thyratron 128 through a resistor 227 and a set 88C of normally closed contacts controlled by the relay 88. A large capacitor 228 is connected between the center tap 154 and the cathode 131. A normally open contact 98C and a normally closed contact 98D, both controlled by the relay 98, are connected in series across the capacitor 228. The junction of these contacts is connected to the fingers 54 through a choke 230, and the cable 55. The fingers 54 are also coupled to the secondary 225 of the coil 218 through an inductance 231, a resistor 232, and a spark gap 233. The resistor 232 is shunted by a capacitor 234. The junction between the capacitor 221 and the resistors 222 is connected to the contactor 56 over a wire 57.

In operation, when the power appears from source 80, it applies a voltage across the pilot light 84 through resistor 83 to indicate its presence. Potential is applied at the same time to the primary 121 of the transformer 122 from a source 120. The resulting voltage across the secondary 123 is applied to the plates 126, 127 of the thyratrons 138, 130 to place them alternately in a condition to conduct when the appropriate voltage is placed on their grids 133 and 134. This voltage is obtained from the source 137 through the transformer 140 after rectification by the rectifiers 147 and 150 and phase shifting by the capacitors 147 and 148 and resistors 142 and 144 to place a positive potential alternately at the grids of these thyratrons to cause them to conduct alternately and place the center tap 154 of the secondary 123 at a high negative potential with respect to the cathodes of the thyratrons. This potential is applied across the resistors 151, 152 and the potentiometer 155 and also across the large capacitor 228 to store the welding energy. Voltage is supplied from a source 166 through the transformer 168 to the rectifier 173 to apply voltage across resistors 202, 203, the coil of the relay 93, and the closed contact 112B as the relay 112 is not inoperative. The capacitor 205 maintains the flow of current through relay 93 after relay 112 operates opening contacts 112B. When relay 93 energizes through resistor 83 and normally open contacts 93A now closed to the coil of relay 88 which operates to close the normally open contacts 88A to open another path from the source 80 through resistor 87 to the coil of relay 88, current also flows through resistors 151 and 152 and the potentiometer 153. A negative potential appears at the arm 155 of the potentiometer 153 when the capacitor 228 is fully charged. This potential is sufficient to prevent the conduction of the tube 162. As a consequence, its plate 164 remains at voltage above the potential at its cathode 163, carrying with it the grid 196 of the tube 187 which conducts, dropping the potential on its plate 186 and with it the potential on the grids 185 and 183 of tubes 176 and 182, preventing them from conducting and the relay 100 from energizing so that contact 100A remains closed. When the capacitor 228 is not fully charged, a less negative potential is applied to the grid 161 of tube 162 with the result that this tube conducts, lowering the potential on its plate 164 and the grid 196 of tube 187. This maintains the plate 186 and the tube 187 at a high potential and with it the grid 183 of the tube 182. This permits the tube 182 to conduct, energizing the relay 100, which causes the normally closed contacts 100A to open, opening the path to the coil of the relay 98 through the normally closed contacts 101 and 102 on the push buttons 103 and 104. This circuit is completed when the foot switch 97 is closed. When this happens, relay 98 operates only when there is a full charge on capacitor 228, closing contacts 98A so that the push buttons 103 and 104 may be pressed and relay 98 will continue to be energized. Contacts 98B will also close, so that when the push buttons 103 and 104 are pressed, relay 94 will be energized as well as solenoids 95 and 107, permitting air to flow to the foot 11, depressing it to hold the lower workpiece tight, and to the shield-driving cylinder 65, bringing the shield down about the work. When the shield contacts the frame of the apparatus, current is induced in the secondary 116 of the transformer 111 to operate relay 112 to close contacts 112A, completing a circuit through relay 113, closing contacts 113A and completing a circuit through contacts 88B, now closed, to energize the solenoid 114, to operate the valve 115, and drive the upper workholder downwards. As the workholder 13 descends, it brings with it the contact 58 which, when it meets the contact 60, grounds one side of the capacitor 221, placing a positive potential on the grid 217 of the tube 207 that until now has received a negative bias from the voltage drop across the resistor 211, forming part of the voltage divider consisting of resistors 213, 212, and 211 connected across the negative potential on the potentiometer 153. This causes the thyratron 207 to conduct, connecting the primary 215 of the transformer 216 to the capacitor 214 in a series resonant circuit. The values of capacitor 214 and the inductance of the primary 215 are selected to resonate at a high frequency. This induces a high A. C. voltage across the secondary 225 which is resonated by the capacitor 226. This causes the spark gap 233 to break down, setting up a series resonant circuit, including the resistor 232, the inductances 231 and 230, the normally open, now closed contact 98B, and the capacitor 228. This circuit resonates at a high frequency to produce a damped oscillation. This voltage appears across the gap between the workpieces 10 and 11 and causes air in the intervening space to become ionized. This causes the gap to break down and permit the charge on the large capacitor 228 to be discharged through the workpieces to make the weld. A normally closed set of contacts 98C connects the upper workholder to the lower workholder whenever relay 98 is not energized.

It can be seen that, if the shield 62 is not fully down and contacting the base, solenoid 114 cannot operate as the relay 113 will not be energized, closing the contacts 113A in series with the solenoid coil 114. The relay 113 energizes over contacts 112A on the relay 112 which is connected in series with the shield 62 and is energized only when the shield is fully down and contacting the base.

It will be seen from Fig. 2 that, when the rod 21 is fully retracted, the conductive piece 50 is out of contact with the fingers 54 which contact the insulating sleeve 48. Thus, no voltage can appear on the workholder 13 at this time. This prevents injury to the operator while affixing a workpiece or removing a welded workpiece. At this time, to further protect the operator, rod 21 is connected to ground through the frame by means of the conductive ring 31, sleeve 32, and the conductive fingers 34 that contact the cylinder 23 and through it the frame 10 to ground the upper workholder 20 when it is in retracted position.

It will be seen from the diagram that both push buttons 103 and 104 must be released before the relay 98, with which they are in series, can be energized initially. Thus the operator cannot tie down one of the buttons and have a hand free during the welding cycle.

Relay 93 receives its current over normally closed contacts 112B which open when relay 112 is operated by the grounding of the shield 62. However, it continues to receive current from the capacitor 205 for a time determined by the time constant of the circuit comprising resistor 203, the coil of the relay 93, and the capacitor 205. If the weld does not take place within this time, in a representative case .6 of a second, relay 93 deenergizes and prevents the weld cycle from proceeding.

The circuit energizing relay 100 has been described above. This operation, as has been explained, is dependent upon there being a full charge across the capacitor 228. Any differences in this voltage are emphasized by the differentiating capacitor 160. This voltage is applied through the tubes 162, 187, 183 and 185 and over normally closed contacts 113B to grids 133, 134 of the thyratrons 128, 130 to control the conductivity of these thyratrons. As this control voltage becomes more negative, the thyratrons conduct less, or rather for a portion of a cycle, and capacitor 228 charges less rapidly. By emphasizing differences in this voltage, smooth cutback of the thyratrons 128 and 130 is obtained. Before the thyratrons cease conducting entirely, the triode 182 ceases conducting and relay 100 is de-energized to indicate a full charge on the capacitor 228. The energization of relay 100 indicates that there is not a full charge on the capacitor 228. Thus relays 98, 94 and solenoid 107 are operated only when there is a full charge on the capacitor 228. As relay 94 controls contact 94A in the supply for relay 113 that, in turn, controls the application of current to the solenoid 114 that applies air to the driving cylinder for the workholder 20, there cannot be a weld when the capacitor 228 is not fully charged. At the completion of a weld, capacitor 228 will be discharged and relay 100 will be energized, opening contacts 100A to disable the welding circuits until such time as capacitor 228 is completely charged again.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. In welding apparatus of the type having at least one movable workpiece holder with means to apply a welding current through the workpieces when the said pieces are in contact comprising a source of direct current shunted by a large capacitor and connected to a movable workpiece through an inductance, and means under control of said movable workpiece holder for starting the discharge of said capacitor through the workpiece holders when the workpiece holders are a predetermined distance apart, a shield adapted to move down about the workpieces to prevent contact with the workpieces and to contain sparks ejected from the weld, means to include said shield in the circuit controlling a relay controlling the supply circuit to prevent welding when the shield is not in its protective position, and means to disconnect the movable workpiece holder from the source of welding energy and place it at the same potential as the other workpiece holder when in retracted position.

2. In welding apparatus of the type having at least one movable workpiece holder with means to apply a welding current through the workpieces when the said pieces are in contact comprising a source of direct current shunted by a large capacitor and connected to a movable workpiece through an inductance, and means under control of said movable workpiece holder for starting the discharge of said capacitor through the workpiece holders when the workpiece holders are a predetermined distance apart, a shield adapted to move down about the workpieces to prevent contact with the workpieces and to contain sparks ejected from the weld, means to include said shield in the circuit controlling a relay controlling the supply circuit to prevent welding when the shield is not in its protective position comprising a relay connected in a circuit completed when the shield is fully extended, and controlling contacts that complete circuits controlling the movement of the movable workholder, and means to disconnect the movable workpiece holder from the source of welding energy and place it at the same potential as the other workpiece holder when in retracted position.

3. In welding apparatus of the type having at least one movable workpiece holder with means to apply a welding current through the workpieces when the said pieces are in contact comprising a source of direct current shunted by a large capacitor and connected to a movable workpiece through an inductance, and means under control of said movable workpiece holder for starting the discharge of said capacitor through the workpiece holders when the workpiece holders are a predetermined distance apart, a shield adapted to move down about the workpieces to prevent contact with the workpieces and to contain sparks ejected from the weld, means to include said shield in the circuit controlling a relay controlling the supply circuit to prevent welding when the shield is not in its protective position, and means to disconnect the movable workpiece holder from the source of welding energy and place it at the same potential as the other workpiece holder when in retracted position comprising at least one conductive finger connected to the source of welding current, and a second conductive finger connected to the lower workpiece holder adapted to make contact with the movable workpiece holder only when said workpiece holder is in a fully retracted position, said first conductive finger adapted to make contact with said movable holder in other positions.

4. In welding apparatus of the type having at least one movable workpiece holder with means to apply a welding current through the workpieces when the said pieces are in contact comprising a source of direct current shunted by a large capacitor and connected to a movable workpiece through an inductance, and means under control of said movable workpiece holder for starting the discharge of said capacitor through the workpiece holders when the workpiece holders are a predetermined distance apart, a shield adapted to move down about the workpieces to prevent contact with the workpieces and to contain sparks ejected from the weld, means to include said shield in the circuit controlling a relay controlling the supply circuit to prevent welding when the shield is not in its protective position, means to disconnect the movable workpiece holder from the source of welding energy and place it at the same potential as the other workpiece holder when in retracted position, and means comprising a pair of push buttons connected in the welding current supply control circuit adapted to provide a conductive path for the welding current only when both said buttons are first released and then pressed comprising a set of normally closed and a set of normally open contacts operated by each of said push buttons, a relay, a set of contacts operated by said relay, and a solenoid controlling the operation of said shield, the set of normally closed contacts being connected across the source of welding current in series with said relay, said set of contacts operated by said relay being in series with said solenoid.

5. In welding apparatus of the type having at least one movable workpiece holder with means to apply a welding current through the workpieces when the said pieces are in contact comprising a source of direct current shunted by a large capacitor and connected to a movable workpiece through an inductance, and means under control of said movable workpiece holder for starting the discharge of said capacitor through the workpiece holders when the workpiece holders are a predetermined distance apart, a shield adapted to move down about the workpieces to prevent operator contact with the workpieces and to contain sparks ejected from the weld, means to include said shield in the circuit controlling a relay controlling the supply circuit to prevent welding when the shield is not in its protective position comprising a relay connected in a circuit completed when the shield is fully extended, and controlling contacts that complete circuits controlling the movement of the movable workholder.

6. In welding apparatus of the type having at least one movable workpiece holder with means to apply a welding current through the workpieces when the said pieces are in contact comprising a source of direct current shunted by a large capacitor and connected to a movable workpiece through an inductance, and means under control of said movable workpiece holder for starting the discharge of said capacitor through the workpiece holders when the workpiece holders are a predetermined distance apart, means to disconnect the movable workpiece holder from the source of welding energy and place it at the same potential as the other workpiece holder when in retracted position, comprising at least one conductive finger connected to the source of welding current, and a second conductive finger connected to the lower workpiece holder adapted to make contact with the movable workpiece holder only when said workpiece holder is in fully retracted position, said first conductive finger adapted to make contact with said movable holder in other positions.

7. In welding apparatus of the type having at least one movable workpiece holder with means to apply a welding current through the workpieces when the said pieces are in contact comprising a source of direct current shunted by a large capacitor and connected to a movable workpiece through an inductance, and means under control of said movable workpiece holder for starting the discharge of said capacitor through the workpiece holders when the workpiece holders are a predetermined distance apart, a shield adapted to move down about the workpieces, a solenoid controlling the operation of said shield, means comprising a pair of push buttons connected in the welding current supply control circuit adopted to provide a conductive path only when when both said buttons are first released and then pressed comprising a set of normally closed and a set of normally open contacts operated by each of said push buttons, a relay, a set of normally open contacts operated by said relay, the set of normally closed pushbutton controlled contacts being connected across the source of welding current in series with said relay, said set of normally open contracts operated by said relay being in series with said shield operating solenoid.

References Cited in the file of this patent

UNITED STATES PATENTS

| | | |
|---|---|---|
| 2,021,173 | Clark | Nov. 19, 1935 |
| 2,211,186 | Weston | Aug. 13, 1940 |
| 2,295,293 | Rogers | Sept. 8, 1942 |
| 2,315,093 | Languepin | Mar. 30, 1943 |
| 2,375,229 | Klemperer | May 8, 1945 |
| 2,473,915 | Slepian et al. | June 21, 1949 |
| 2,515,636 | Dawson et al. | July 18, 1950 |